(12) United States Patent
Millard

(10) Patent No.: US 6,643,685 B1
(45) Date of Patent: Nov. 4, 2003

(54) METHOD OF CREATING UNIQUE USER ALIASES FOR USERS IN A COMMUNICATIONS NETWORK

(75) Inventor: Lee A Millard, Emsworth (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/449,653

(22) Filed: Nov. 30, 1999

(30) Foreign Application Priority Data

May 6, 1999 (GB) .............................................. 9910360

(51) Int. Cl.[7] .............................................. G06F 15/16
(52) U.S. Cl. ........................ 709/206; 709/207; 709/230; 709/235
(58) Field of Search ................................. 709/206, 207, 709/230, 235

(56) References Cited

U.S. PATENT DOCUMENTS

| | | | |
|---|---|---|---|
| 5,493,564 A | 2/1996 | Mullan | 341/22 |
| 5,724,510 A | 3/1998 | Arndt et al. | 709/220 |
| 5,745,699 A | 4/1998 | Lynn et al. | 709/235 |
| 5,822,526 A | * 10/1998 | Waskiewicz | 709/206 |
| 6,161,129 A | * 12/2000 | Rochkind | 709/204 |
| 6,405,243 B1 | * 6/2002 | Nielsen | 709/206 |
| 6,412,014 B1 | * 6/2002 | Ryan | 709/203 |
| 2002/0065875 A1 | * 5/2002 | Bracewell et al. | 709/203 |
| 2002/0087620 A1 | * 7/2002 | Rouse et al. | 709/203 |

* cited by examiner

Primary Examiner—Meng-Al T. An
Assistant Examiner—Sindya Narayanaswamy
(74) Attorney, Agent, or Firm—Jerry W. Herndon

(57) ABSTRACT

The invention operates in an MS/Exchange network comprising a plurality of servers each having a plurality of user subscribers and, for example, an Internet gateway server. The servers have unique X400 attributes and are adapted to independently allocate email aliases. The method of the invention creates unique Internet aliases for users by: exporting a user directory from a mail server in the network to the gateway server, the user directory containing a plurality of user X400 address attributes dependent on the unique attribute of the user's mail server; extracting from the directory an X400 mail address attribute for each user; and from the mail address attribute generating an Internet alias for the gateway.

4 Claims, 4 Drawing Sheets

US 6,643,685 B1

METHOD OF CREATING UNIQUE USER ALIASES FOR USERS IN A COMMUNICATIONS NETWORK

FIELD OF THE INVENTION

The present invention relates to a method of creating unique user aliases for users in a communications network, such as, for example, an MS/Exchange network.

BACKGROUND OF THE INVENTION

An MS/Exchange Network comprises a collection of autonomous MS/Exchange sites, which are a collection of one or more MS/Exchange servers. MS/Exchange is a non-Internet-based email system. Its internal addressing is X400. However, directories are largely used to hide these complexities from users. When email has to leave an MS/Exchange server, via a gateway, e.g. Internet, an address mapping using a directory must take place between the internal name of the user and an alias address suitable for the gateway.

An X400 address is of the form:

Given name=Lee , Surname=Millard, ADMD=, PRMD= Exchange Organisation Name, Organisation=Exchange Site Name whereas, for example, an Internet or SMTP (Simple Mail Transfer Protocol) alias is an email address in the form:

User @ domain, eg. Lee.Millard@uk.ibm.com

The design of MS/Exchange thus forces unique X400 user names around a worldwide organisation. Sites cannot connect unless they have a unique Exchange Organisation and Site name combination. Thus, every user will have a unique X400 alias.

In an MS/Exchange network, however, each site controls the allocation of other email aliases (e.g. Internet aliases) for users within the site. So, although an internet alias defaults to:

Firstname.Lastname@site.organisation.com (which is unique)

It can be changed by an administrator and will typically be changed as the "site / internet domain alias" relationship does not often match. A worldwide company, for example, may require a common domain name for all its employees, e.g., Lee.Millard@multinational.com. This can be changed independently in each MS/Exchange Site. So, because the allocation of Internet addresses is not controlled centrally, one server may allocate the same alias for a user as another server in another site.

When MS/Exchange sites are connected together, their directories can be synchronised through replication. MS/Exchange Directory replication does not correct the problem of allocating duplicate aliases.If any aliases are duplicated, the user aliases become unusable for external traffic. There is no method of detecting the duplicates until the user attempts to use the alias for external mail. Further, because the format of the alias is determined independently by each site, no central control of the format is possible.

This is a problem within Exchange which is not fully recognised by many implementors, and which reveals itself, in particular, if an organisation utilises a single server to act as a mail gateway to either the Internet, SNADS, Lotus Notes or some other mail system where the Exchange site may set an alias independently. In such a case, external mail is sent to the gateway server, and a copy of the replicated directory local to the gateway server is used to identify the alias of the sender. The gateway server, although served by MS/Exchange directory replication, has the inherent problem of duplicate or uncontrolled alias allocation as previously described.

It is an object of the present invention to mitigate these problems.

DISCLOSURE OF THE INVENTION

Accordingly, the invention provides a method of creating unique user aliases for users, comprising the steps of: from a mail server in a network, exporting a user directory to the gateway server, said user directory containing a plurality of user mail address attributes dependent on a unique attribute of said user's mail server; extracting from said directory a unique mail address attribute for each user; and from said mail address attribute, generating a unique user alias for said gateway.

BRIEF DESCRIPTION OF THE DRAWINGS

An embodiment of the invention will now be described with reference to the accompanying drawings, in which.

DESCRIPTION OF THE PREFERRED EMBODIMENTS

Figure 1:
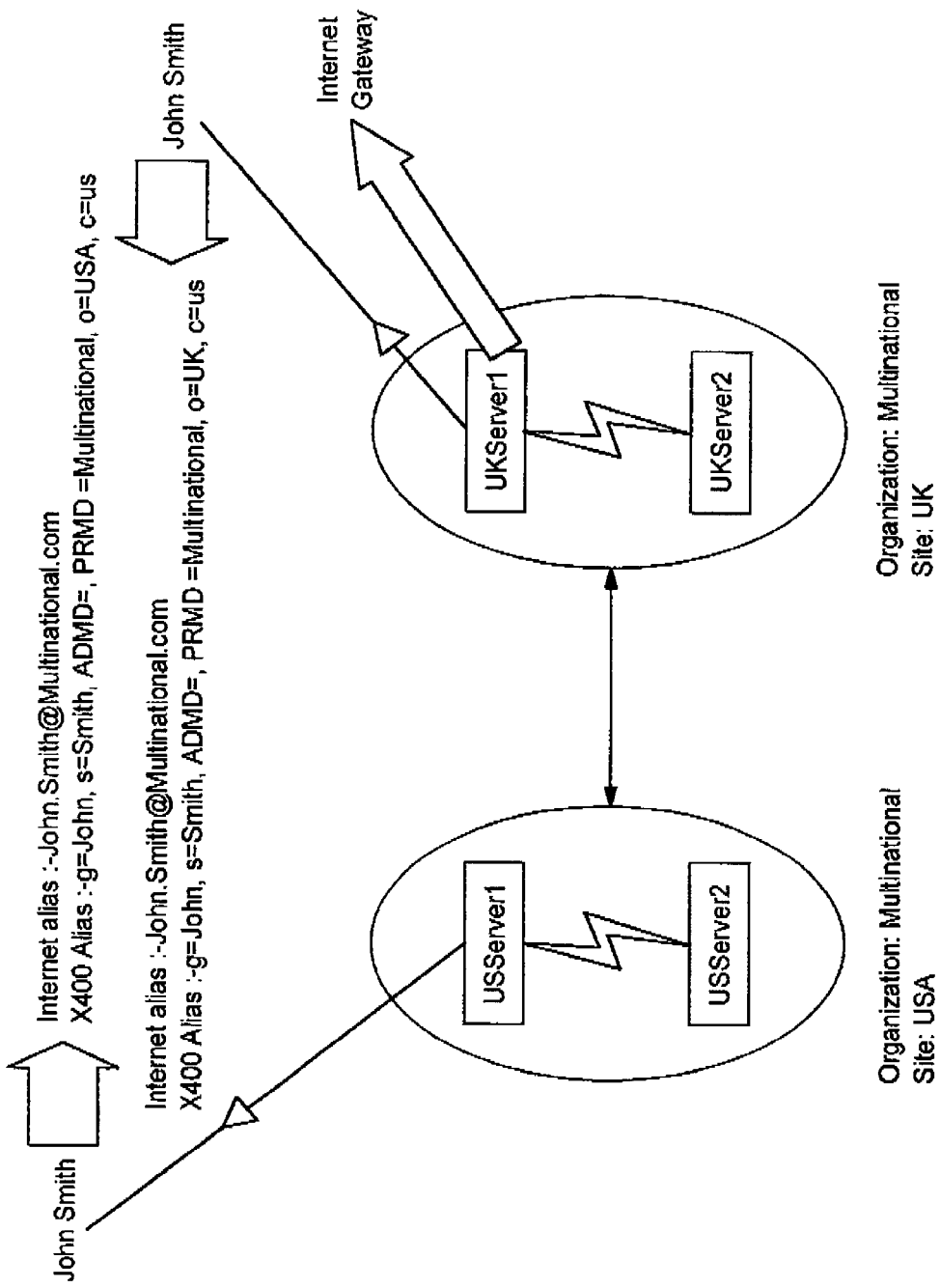
FIG. 1 shows a prior art worldwide MS/Exchange Network including a plurality of sites.

The invention comprises the setup of a gateway MS/Exchange server in a site to which a standard X400 connection is made to all other MS/Exchange sites. However, directory replication is disabled on the gateway server and the invention provides a method of creating a directory for this server and the ability correctly to allow mail flow between the component servers of the MS/Exchange network.

The directory for the gateway server is automatically created by periodically executed batch jobs that perform the following steps:

1) From any other site in the MS/Exchange network, exporting the synchronised directory using a standard MS/Exchange utility—admin—to the gateway server.

2) On the gateway server, a dedicated program processes the exported directory to produce an import file including a directory in a standard MS/Exchange import format for custom users.

The execution of these batch jobs might be daily, for example.

In MS/Exchange, there are two types of users: Native and Custom. Native users have an email address comprising an internal Distinguished Name (DN) that is not seen by the user, but which is based on the user's unique X400 attributes. Custom users have, for example, a SMTP, X400 or SNADS address. When a custom user is created in a server directory, the user is automatically given an alias for all other types of email. In any case, it should be noted that each user in the directory will have a unique X400 Address.

The dedicated program creates each user in the import file as if the user were a native X400 user (to an Exchange server the user is regarded as a custom user) with no SMTP alias allocated. It does this essentially by stripping away all non-X400 attributes from the original synchronised directory entry for the user.

3) On the gateway server, the import file is used in the standard MS/Exchange import utility—admin. As a result an Internet alias proxy generator for the gateway server is applied, and unique aliases are automatically allocated in the directory for the gateway server.

This is because the gateway server allocates aliases for all users within the Exchange network with the knowledge of the aliases allocated for other users. So even though it may apply the same rules for generating the aliases as the mail server components of the network may have done, it knows which aliases it has allocated. So that after generating John.Smith@multinational.com once, when the alias generation rules would cause the gateway server to default to generating such an address again, the gateway server knows that it must vary the second alias. In the embodiment, the gateway server alias generation rules simply cause a "1" to be added to the end of the Lastname in the alias. However, it will be seen that any variation is possible, for example, if a user's middle initial is available, this can be used to distinguish the second alias from the first generated alias.

In any case, it will be seen that the Exchange Network now has an additional gateway server. When mail is sent from downstream servers, each user is identified as an X400 user (because the X400 connector is used), and addressing details pass between each server as native X400. When a distribution destined for the internet arrives at the gateway server, a directory lookup is made on the X400 attribute in a user's directory entry to obtain the Internet Alias for the sender. The distribution then passes cleanly out to the Internet. Further, distributions from the internet are correctly mapped to the correct MS/Exchange user.

Referring now to FIG. 1, for a more specific example, which shows two servers in a site in the US and two servers in a site in the UK. A user called John Smith is added to the US directory with an internet (SMTP) alias John.Smith@multinational.com and a unique X400 alias. Another John Smith is added in the UK with the same alias allocated, but with a unique X400 alias.

Figure 2:
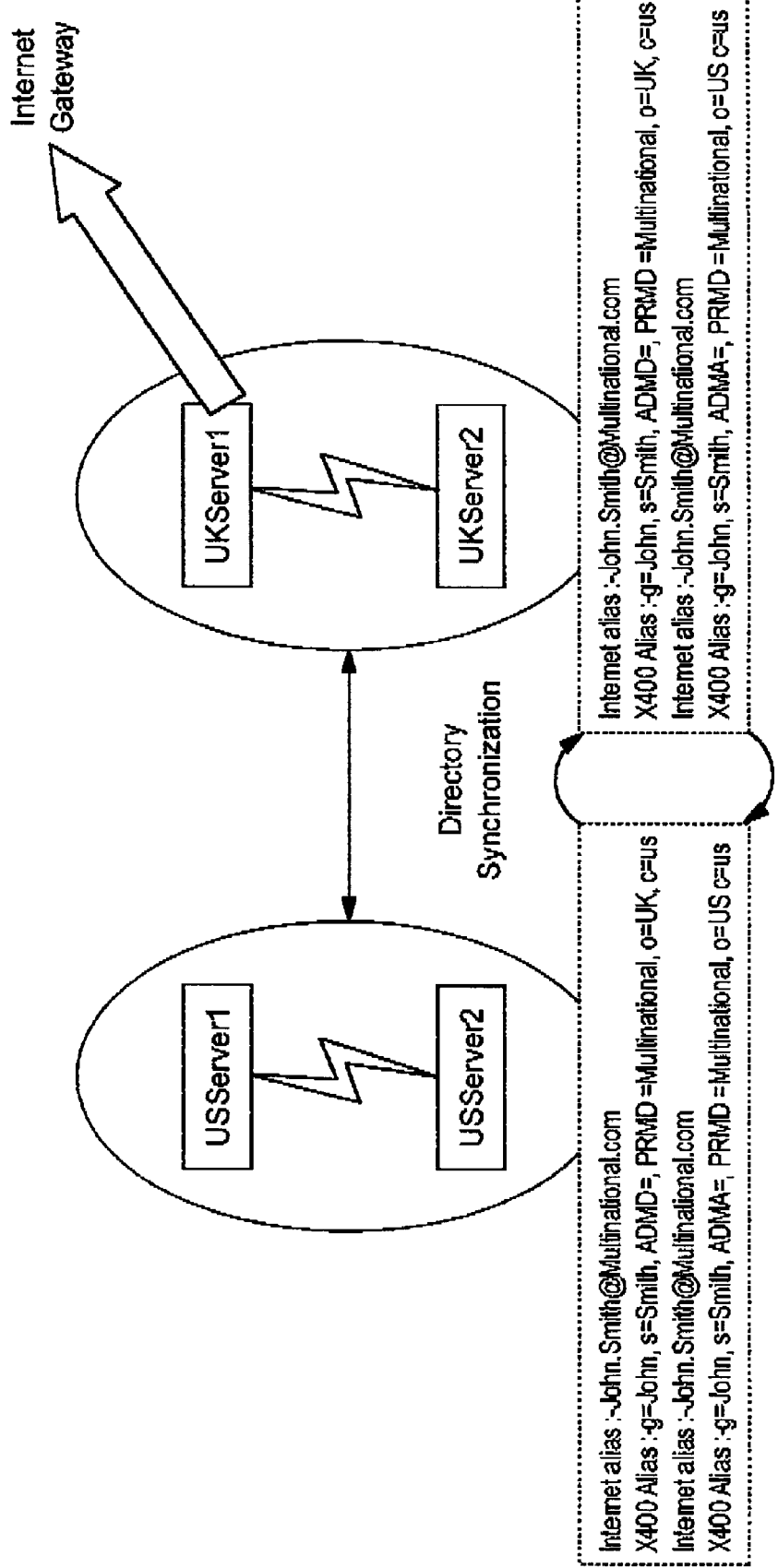
FIG. 2 shows the results of standard directory replication between the sites of FIG. 1.

FIG. 2 shows the results of standard directory replication between the sites, with the result that both Directories have two John Smiths with unique X400 aliases, but the same SMTP alias.

Figure 3:
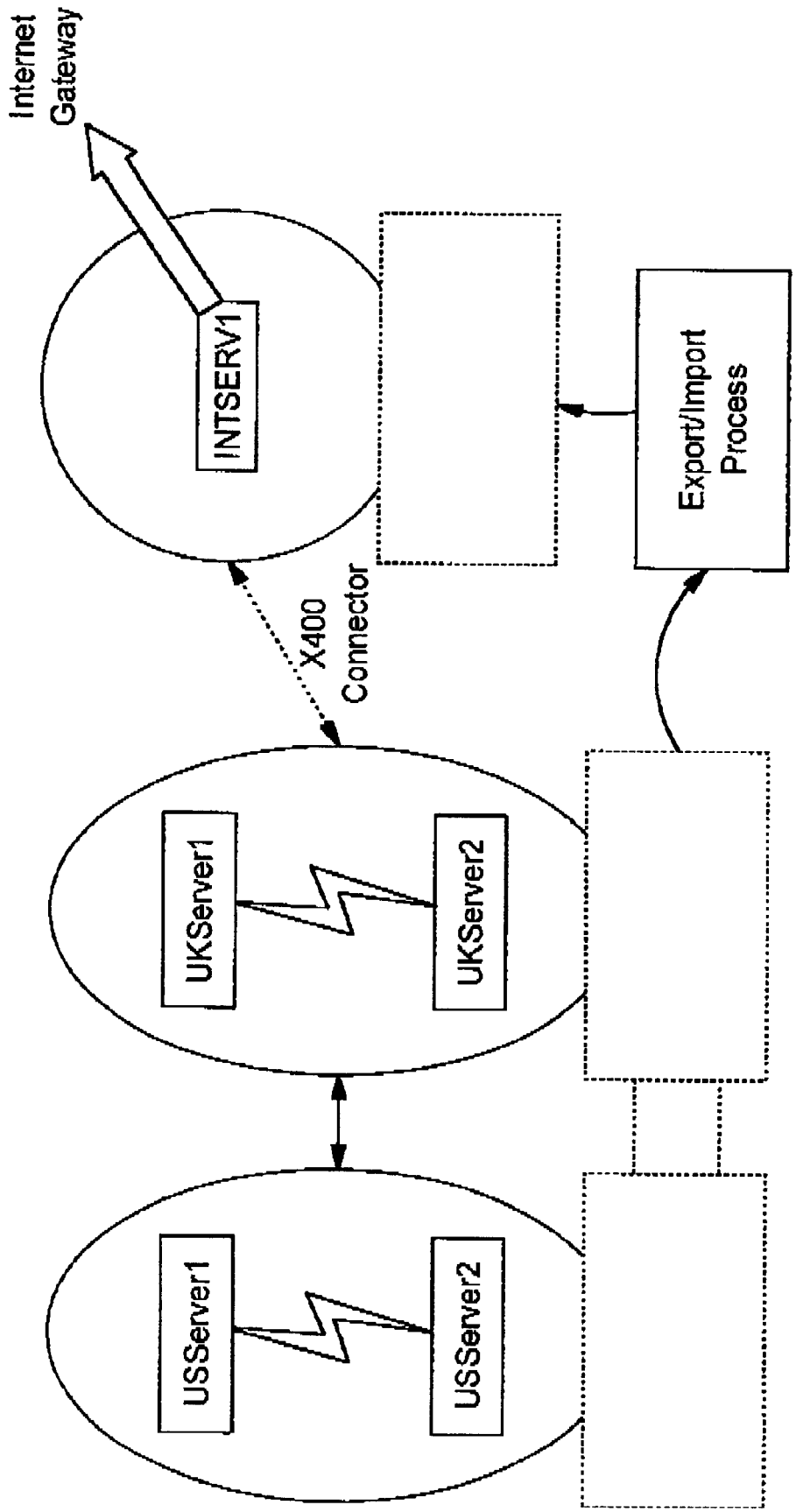
FIG. 3 shows the connection of a gateway server according to the invention to the network of FIG. 1.

Referring to FIG. 3, a new Exchange site is setup according to the invention, e.g. Organisation=Multinational, Site=Internet, as the Exchange Network Internet gateway. The synchronised directory from any server in any site within the worldwide organisation is then used to extract the directory for the gateway server. This is then processed to produce what are known as MS/Exchange "Custom Recipients", which are special user records where each user is defined as an X400 native user with a unique address. The user is added without an SMTP alias and an unique alias is automatically generated by the gateway server.

Figure 4:
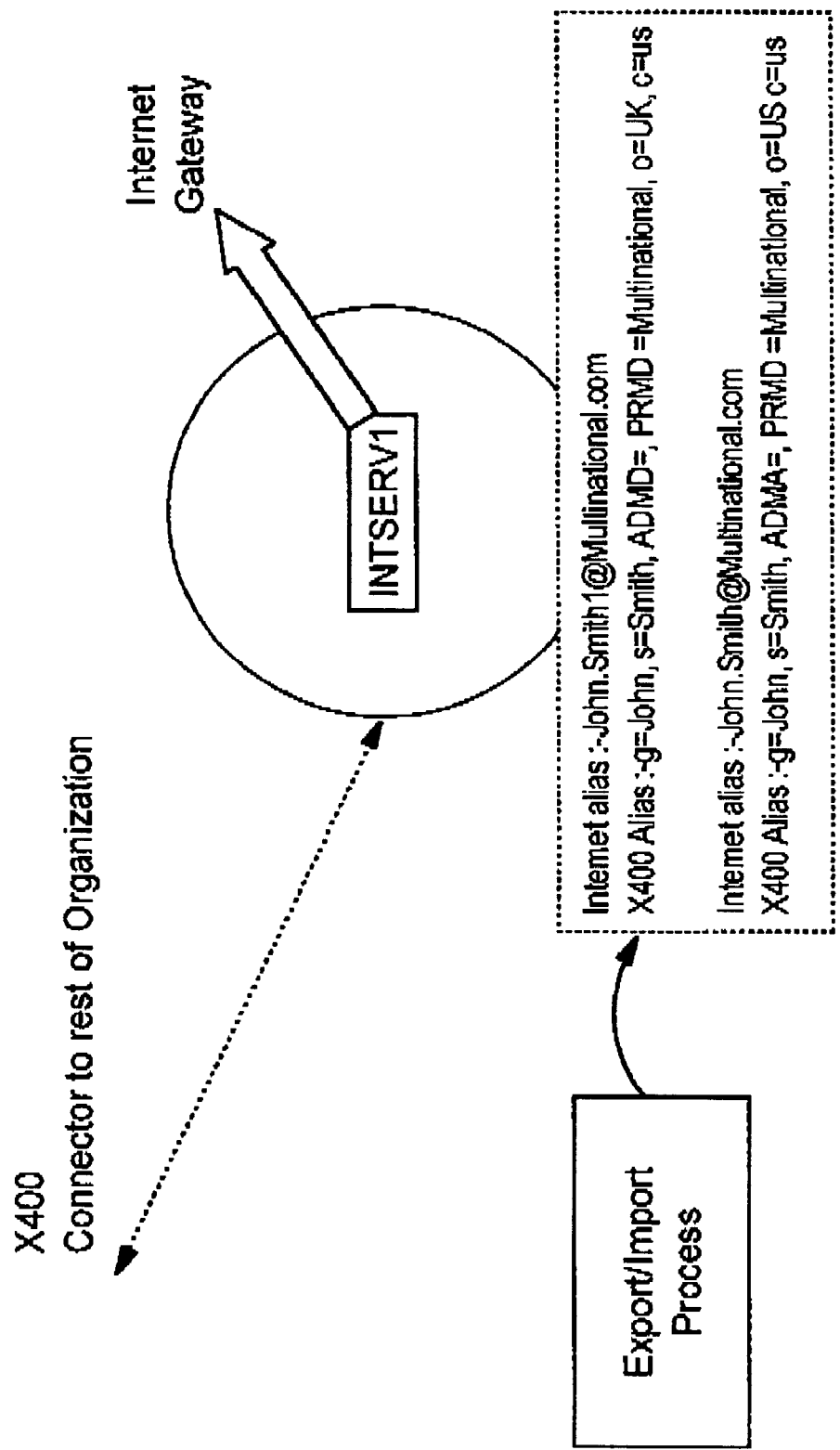
FIG. 4 shows the resulting directory entries on the gateway server of FIG. 3.

FIG. 4 shows the created directory, with both John Smith's with the original unique X400 aliases, but now with unique SMTP aliases.

It should be seen that the gateway server only requires the MS/Exchange directory for mapping to and from the Internet. Synchronisation of other fields is not required and the gateway server directory need never be used for other personal information held on the other network Exchange servers.

It will be seen that the invention can be applied to other gateways that MS/Exchange utilises, ie SNADS, Lotus Notes, OV/VM, as all of these gateways use address aliases allocated by MS/Exchange sites around an organisation.

It should be noted that the aliases generated on the gateway server are not replicated back to the other Exchange network servers. While the other network servers have duplicate aliases, those aliases will never be used, as the aliases for the gateway are only used on the gateway server.

The invention, however, is not limited to a single gateway server. There is no reason why several gateway servers could not be used in an organisation. For example, an organisation may have a US and a UK gateway. They could both generate unique aliases from their associated domain name, eg xxx@uk.multinational.com and xxx@us.multinational.com. The US exchange servers would route SMTP destined mail to the US special server and the UK exchange servers would route SMTP destined mail to the UK server.

Finally, it should be seen that while the invention has been described in terms of a problem with MS/Exchange, the invention is applicable to any communications network where component mail servers of the network allocate mail aliases independently of one another.

What is claimed is:

1. A method for generating unique e-mail aliases for e-mail users in a network, the network comprising a plurality of mail servers each providing e-mail services according to a native e-mail protocol, wherein at least a subset of the servers communicate with gateways for sending and receiving e-mail messages in protocols other than the native protocol, comprising the steps at a server of receiving and replicating into the local user directory user e-mail addresses from the directories of other ones of the servers, generating e-mail aliases from the user addresses in the replicated directory for use by a gateway in sending and receiving e-mail messages in a protocol other than the native e-mail protocol, insuring that the generated aliases are unique by adding an arbitrary attribute to one of duplicate aliases consistent with the addressing format of the non-native protocol.

2. A method as claimed in claim 1 wherein said mail servers are MS/Exchange servers.

3. A method as claimed in claim 1 wherein said gateway server is an Internet gateway.

4. A computer program storage product for storing computer instructions, which when loaded and executed in a computer causes the computer to perform a method for generating unique e-mail aliases for network e-mail users, wherein the network comprises a plurality of mail servers each providing e-mail services according to a native e-mail protocol, wherein at least a subset of the servers communicate with gateways for sending and receiving e-mail messages in protocols other than the native protocol, the method comprising the steps at the computer of receiving and replicating into the local user directory user e-mail addresses from the directories of other ones of the servers, generating e-mail aliases from the user addresses in the replicated directory for use by a gateway in sending and receiving e-mail messages in a protocol other than the native protocol, insuring that the generated aliases are unique by adding an arbitrary attribute to one of duplicate aliases consistent with the addressing format of the non-native protocol.

* * * * *